May 5, 1931.  A. E. STANLEY ET AL  1,803,659
PRESSURE REGULATING DEVICE
Filed Oct. 31, 1927   4 Sheets-Sheet 1

Inventors
Arthur E. Stanley
Robert Zones
By
Attorney

Inventors
Arthur E. Stanley
Robert Zones

May 5, 1931.  A. E. STANLEY ET AL  1,803,659
PRESSURE REGULATING DEVICE
Filed Oct. 31, 1927  4 Sheets-Sheet 3

Inventors,
Arthur E. Stanley
Robert Zones
By George J. Hitsch
Attorney

Inventors.
Arthur E. Stanley
Robert Zones

Patented May 5, 1931

1,803,659

UNITED STATES PATENT OFFICE

ARTHUR E. STANLEY, OF ELKHART, AND ROBERT ZONES, OF MISHAWAKA, INDIANA

PRESSURE REGULATING DEVICE

Application filed October 31, 1927. Serial No. 230,118.

The invention relates to pressure regulating devices, particularly adapted for use in connection with air dispensing machines of the character used in automobile service stations, and has for its object to provide a device of this character wherein the operator can set a pressure indicator for a desired pressure of inflation, and when the desired pressure is obtained within the tire and pipe line leading thereto, said pressure regulator will automatically cut off the supply of air to the tire.

A further object is to provide the device with a rotatable shaft having an indicator pointer cooperating with a dial and to control the cut off valve by means of a pivoted lever against which a tension spring engages for holding the valve closed until a pressure is obtained greater than the tension of the spring, the tension of the spring being varied by a rotatable member on which the pointer is mounted.

A further object is to provide a diaphragm control member cooperating with the pivoted lever against which the tension spring engages and an air passage between the pipe line and one side of the diaphragm whereby the pressure within the pipe line will actuate the diaphragm and diaphragm controlled member.

A further object is to provide a block slidably mounted on a rod and having a link and arm connection with the valve and means whereby upon rocking the pivoted control lever in either direction, said block will be slidably moved for moving the valve to open or closed position.

A further object is to provide the free end of the pivoted control lever with an arm which extends into a recess of the slidable block for moving said block and a coiled spring connected to the arm and the frame of the device and forming means for yieldably holding the control lever in its extreme positions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
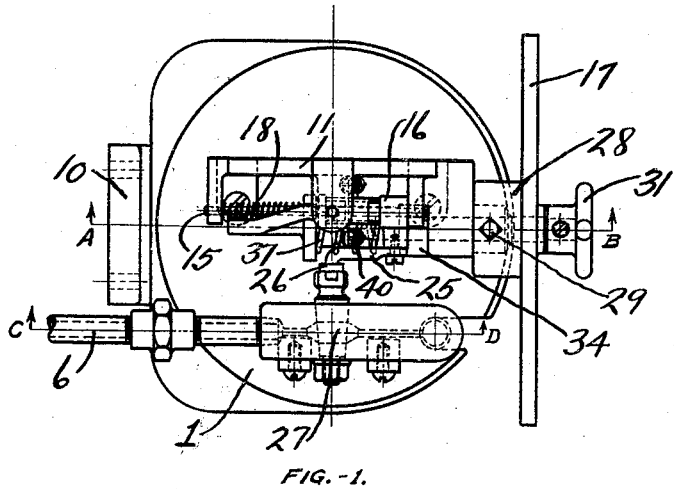
Figure 1 is a top plan view of the regulator.
Figure 2:
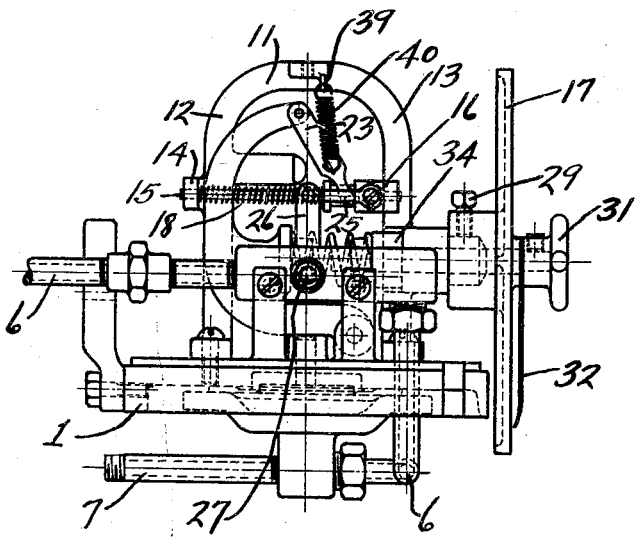
Figure 2 is a side elevation of the regulator.

Referring to the drawings the numeral 1 designates the base of the device and secured to the under side thereof by means of screws 2 is a diaphragm casing 3 having a chamber 4 therein. The diaphragm casing 3 is provided with a downwardly extending projection 5, into one side of which is threaded an air supply pipe 6, which leads from any suitable source of air supply. Threaded into the other side of the projection 5 is a discharge pipe 7, to which a flexible hose may be attached for conducting compressed air to a tire to be inflated. Projection 5 is provided with a chamber 8 in communication with the diaphragm chamber 4, and disposed within the chamber 4 is a flexible diaphragm 9 against the under side of which the air pressure acts for forcing the same upwardly when a predetermined pressure is obtained within the tire and pipe 7 for automatically closing a valve hereinafter set forth. One side of the base 1 is provided with a bracket 10, by means of which the device may be attached to a support.

Figures 5, 6:
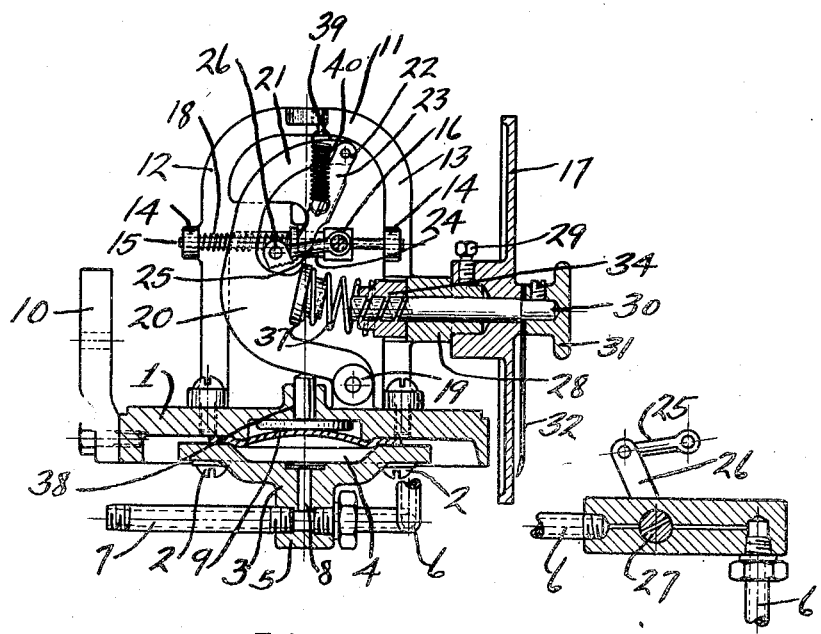
Figure 5 is a vertical longitudinal sectional view through the regulator showing the parts in cut off position.
Figure 6 is a vertical longitudinal sectional view through the air valve showing the same in cut off position.

Extending upwardly from the upper side of the base 1 is an inverted U-shaped bracket 11, the arms 12 and 13 of which are secured to the base 1, and fixedly mounted at 14 in the arms 12 and 13 is a shaft 15, on which is slidably mounted a block 16, and the block 16 is normally forced towards the indicating dial 17 by means of a spring 18 for preventing lost movement of the parts. Pivotally mounted at 19 on the base 1 is an operating lever 20, which operating lever is substantially U-shaped as shown in Figure 5 and has its curved arm 21 disposed above the rigid shaft 15, and has pivoted thereto at 22 an arm 23, the end of which is disposed in a recess 24 of the slide block 16 and forms means whereby said slide block, under different conditions, will be forced in opposite directions for imparting a pull or push to the link connection 25 with the valve arm 26, which valve arm is carried by a plug valve 27 in the air supply line for cutting off the supply of air when a predetermined pressure is obtained.

Figures 3, 4:
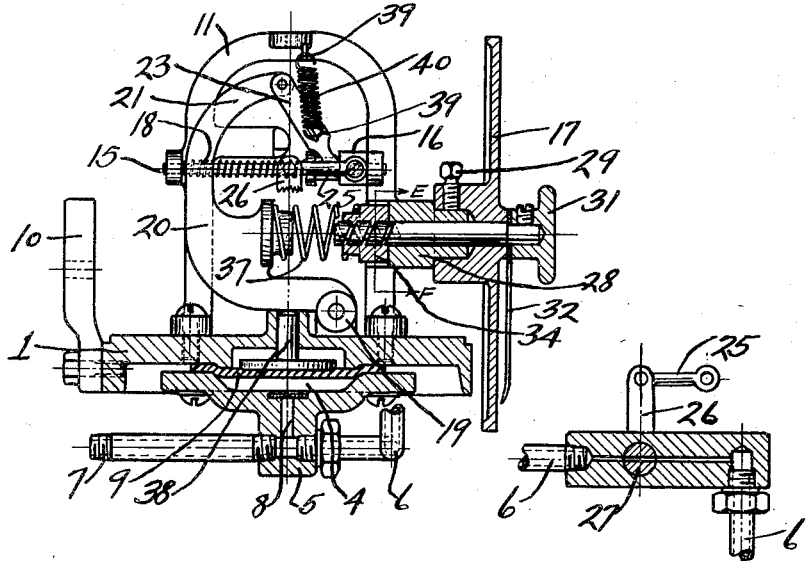
Figure 3 is a vertical longitudinal sectional view through the regulator.
Figure 4 is a vertical longitudinal sectional view through the cut off valve.
Figure 7:
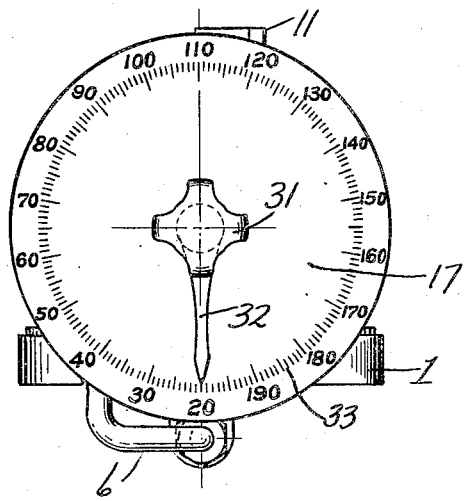
Figure 7 is a front elevation of the regulator.
Figure 8:
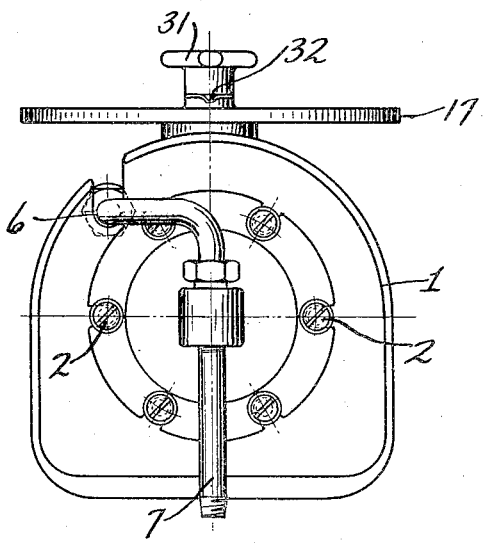
Figure 8 is a bottom plan view.
Figure 9:
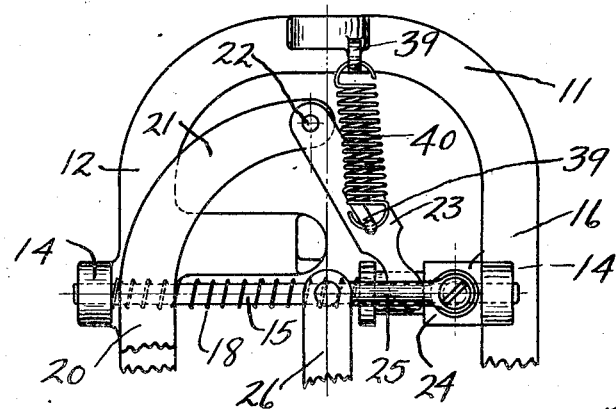
Figure 9 is an enlarged side elevation of the upper portion of the regulator showing the same in open position.
Figure 11:
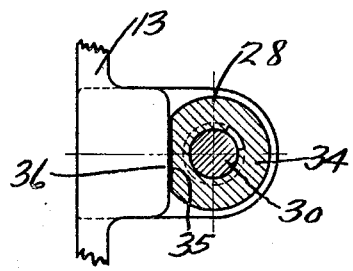
Figure 11 is a detail sectional view transversely through the tension spring regulating nut.
Figure 10:
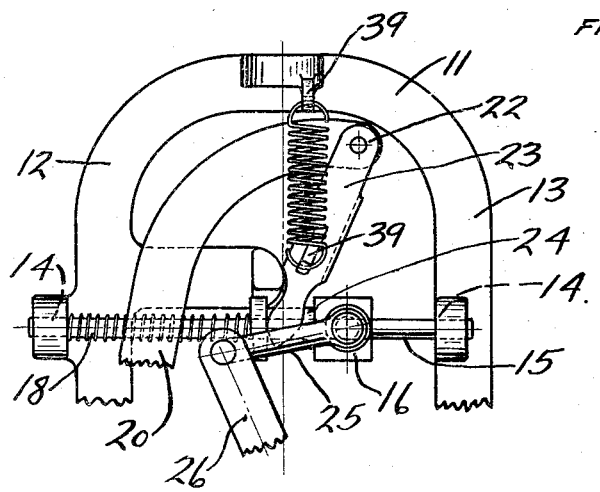
Figure 10 is a view similar to Figure 9 showing the parts in closed position.

The arm 13 of the U-shaped bracket 11 is provided with a hub 28, on which is rigidly secured by means of a set screw 29 the dial 17, and rotatably mounted in said dial and in the hub 28 is a shaft 30 having a knob 31 and an indicating pointer 32, which pointer is adapted to be moved into registration with any of the graduations 33 on the dial 17 for setting the device to a predetermined pressure. Threaded on the inner end of the rotatable shaft 30, better shown in Figure 11, is a nut 34 having a flat side 35, which engages the shoulder 36 of the arm 13. Therefore it will be seen that when the shaft 30 is rotated for positioning the pointer 32, in relation to the dial graduation 33, said nut 34 will be moved inwardly or outwardly for varying the tension of the spring 37, and which tension is overcome by the upward movement of the diaphragm 9 on the slidable member 38, which engages the under side of the pivoted operating member 20 adjacent its pivotal point 19, and referring to Figure 3, it will be noted that the parts are shown in position where the valve 27 is opened for supplying air to the tire. As the pressure within the tire rises, for instance to twenty pounds as indicated in Figure 7, the diaphragm 9 bulges upwardly as shown in Fig. 5, thereby forcing the member 38 upwardly and pivotally moving the pivoted member 20, which action will cause the pivot point 22 to move towards the dial 17 and as the pivoted arm 23 is disposed within the recess 24 of the slide block 16, it is obvious that the pivot point 22 will move through a line between the anchoring points 39 of the coiled spring 40, which is anchored to the U-shaped frame 11 and to the arm 23. Therefore it will be seen that as soon as the pivotal point 22 moves beyond alined relation to the spring anchoring point 39, said spring 40 will impart a pull upwardly on the arm 23 which action will move the slide block 16 to the positions shown in Figures 5 and 10, thereby causing the link 25 to impart a push on the valve arm 26 for moving the plug valve 27 to the closed position shown in Figure 6, consequently immediately shutting off the supply of air to the tire, thereby preventing overinflation of the tire. It is to be understood that the air supply pipe may be provided with a valve between the device and the air supply tank whereby when the device is not in use, air may be cut off. However applicant does not limit himself to this particular feature, as it will be noted after the operation of the device the plug valve 7 is in closed position.

From the above it will be seen that a pressure regulator or indicator is provided which is simple in construction, with parts reduced to a minimum, and one which is particularly adapted for use while inflating automobile tires, for positively preventing overinflation of tires.

The invention having been set forth what is claimed as new and useful is:—

1. The combination with an air pipe line, a plug valve in said pipe line, a diaphragm controlled member, of a pivoted lever adjacent said diaphragm controlled member and moved by said member upon a predetermined pressure, a support adjacent said pivoted lever, means for adjusting said support in relation to the pivoted lever, an expansion spring interposed between the support and the pivoted lever and acting against the diaphragm controlled member, an arm carried by said plug valve, a slidable block, a link connection between the slidable block and the arm of the plug valve, a pivoted arm carried by the pivoted lever and disposed in a recess of the block, a spring, one end of said spring being anchored to the pivoted arm and at a point above said pivoted arm in a position where the pivotal point of the arm will pass therebetween.

2. The combination with an air pipe line, a valve carried by said line, an arm carried by said valve, of a diaphragm control member carried by said pipe line, a pivoted U-shaped lever adjacent said diaphragm control member and which is pivotally moved by said diaphragm control member, a rotatable shaft, a slidably mounted member threaded on said rotatable shaft, an expansion spring interposed between the U-shaped member and the slidable member, means for varying the tension of the expansion spring, said expansion spring exerting force opposed to the diaphragm control member, a slidable block, a link connection between the slidable block and the valve arm, an arm carried by said pivoted U-shaped lever, the free end of said arm being disposed in a recess of the slidable block, and spring means cooperating with said arm whereby upon overcoming of the pressure of the expansion spring said arm will be forced in one direction for moving the block and closing the valve.

3. A valve cut off mechanism comprising a base, a pivoted member mounted on said base, a diaphragm controlled member cooperating with said pivoted member, a valve closing arm, a slidable block, a link connection between the slidable block and the valve closing arm, an arm pivoted to the pivoted member and extending into a recess of the slidable block, spring means cooperating with the last named arm for forcing the block beyond a center, and a variable expansion spring cooperating with the pivoted member and acting in a direction opposed to the diaphragm controlled member.

4. A pressure control valve cut off mechanism comprising a base, a U-shaped pivoted arm mounted on said base, a diaphragm controlled plunger cooperating with one arm of the U-shaped arm adjacent its pivotal point, the other arm of said U-shaped member having a link pivotally connected thereto, a slidable block in a recess of which the link engages, a valve control arm, a link connection between the block and the valve control arm, a rotatable shaft, a slidable member through which the shaft is threaded, an expansion spring interposed between the slidable member and the U-shaped pivoted arm and acting counter to the diaphragm controlled member and adapted to be overcome at predetermined pressures, and spring means cooperating with the link connection between the block and valve control arm and forming means whereby said block is moved in opposite directions for moving the valve arm.

5. The combination with an air supply pipe line, a valve in said pipe line, and means adapted to control the action of said valve, said means comprising a diaphragm controlled plunger, a by-pass perpendicularly extending from a straight portion of said air supply pipe line and terminating adjacent said diaphragm, a pivoted lever cooperating with said plunger, a regulable spring against which said lever operates, an arm carried by said lever, and a slidable block controlled by said arm adapted to actuate said valve.

6. The combination with an air supply pipe line, a valve in said pipe line, a diaphragm in communication with said pipe line through a by-pass perpendicularly extending from a straight portion of said pipe line, a plunger controlled by said diaphragm, a pivoted lever actuable by said plunger, a regulable spring against which said lever operates, a spring actuated arm pivotally secured to said lever, and a slidable block actuable by said arm adapted to control said valve.

7. The combination with an air supply pipe line, a valve in said pipe line, a diaphragm in communication with said pipe line through a by-pass perpendicularly extending from a straight portion of said pipe line, a plunger controlled by said diaphragm, a pivoted lever actuable by said plunger, a regulable spring against which said lever operates, means for regulating said spring, a spring actuated arm pivotally secured to said lever, and a slidable block actuable by said arm, said valve having an arm controlled by said block.

8. The combination with an air supply pipe line, a valve in said pipe line, a diaphragm in communication with said pipe line, a plunger controlled by said diaphragm, a pivoted lever actuable by said plunger, a spring actuated arm pivotally secured to said lever, a slidable block actuable by said arm and controlling said valve, a regulable spring against which said lever operates, and means for regulating said spring, said means comprising a support, a shaft rotatably carried by said support, and a slidable member threaded on said shaft and engaging said support, said spring bearing against said member.

In testimony whereof we affix our signatures.

ARTHUR E. STANLEY.
ROBERT ZONES.